United States Patent
Chan

(10) Patent No.: US 9,264,276 B1
(45) Date of Patent: Feb. 16, 2016

(54) ADAPTATIONS FOR PARTIAL RESPONSE SUMMATION NODE EMBEDDED FPGA TRANSCEIVER

(71) Applicant: Altera Corporation, San Jose, CA (US)

(72) Inventor: Allen K. Chan, San Jose, CA (US)

(73) Assignee: ALTERA CORPORATION, San Jose, CA (US)

( * ) Notice: Subject to any disclaimer, the term of this patent is extended or adjusted under 35 U.S.C. 154(b) by 0 days.

(21) Appl. No.: 14/541,251

(22) Filed: Nov. 14, 2014

(51) Int. Cl.
H03H 7/30 (2006.01)
H03K 9/00 (2006.01)
H04L 27/26 (2006.01)
H04L 27/01 (2006.01)

(52) U.S. Cl.
CPC ............ *H04L 27/2647* (2013.01); *H04L 27/01* (2013.01)

(58) Field of Classification Search
USPC ............. 375/211, 219, 220, 222, 229–236, 375/240.26–240.29, 295, 311, 316, 318, 375/317, 324, 340, 345, 346, 350
See application file for complete search history.

(56) References Cited

U.S. PATENT DOCUMENTS

| | | | | |
|---|---|---|---|---|
| 6,737,995 B2* | 5/2004 | Ng | ............ | G11B 20/10203 341/68 |
| 7,864,647 B2* | 1/2011 | Haddad | ............ | G11B 7/0053 369/59.17 |
| 8,175,143 B1* | 5/2012 | Wong et al. | ............ | 375/232 |
| 8,787,844 B2* | 7/2014 | Chu | ............ | H04B 1/38 379/406.01 |
| 9,014,252 B2* | 4/2015 | Dong | ............ | H04L 25/03178 375/229 |
| 2009/0175322 A1* | 7/2009 | Shih | ............ | H04L 7/033 375/219 |
| 2011/0096825 A1* | 4/2011 | Hollis | ............ | 375/233 |
| 2013/0077669 A1* | 3/2013 | Malipatil et al. | ............ | 375/233 |
| 2013/0147520 A1* | 6/2013 | Payne | ............ | 327/51 |
| 2013/0148712 A1* | 6/2013 | Malipatil et al. | ............ | 375/233 |
| 2014/0169426 A1* | 6/2014 | Aziz et al. | ............ | 375/224 |

* cited by examiner

*Primary Examiner* — Linda Wong
(74) *Attorney, Agent, or Firm* — Ropes & Gray LLP

(57) ABSTRACT

Systems and methods are described that include adaptation circuitry for processing a data signal. The adaptation circuitry may include summation node circuitry for processing an error value associated with the data signal. The adaptation circuitry may also include adaptation engine circuitry, coupled to the summation node circuitry, for controlling the operation of the summation node circuitry.

19 Claims, 7 Drawing Sheets

ADAPTATIONS FOR PARTIAL RESPONSE SUMMATION NODE EMBEDDED FPGA TRANSCEIVER

BACKGROUND OF THE INVENTION

This disclosure relates generally to circuitry for recovering data information from a serial data signal received by the circuitry, and more particularly the area of signal adaptation, including dLev adaptation and variable gain amplifier adaptation, for a partial response summation node.

Communication of data between components of a system by means of so-called high-speed serial data signals is of increasing interest and importance to electronic system designers and users. Illustrative use of high-speed serial data signals is for conveying data from one programmable logic integrated circuit ("IC") in a system to another programmable logic IC in the system or between components of the same such IC.

A problem that is common to many uses of high-speed serial data signals is that they are generally subject to loss of clarity or fidelity as they propagate through whatever medium is used to transmit them. Such loss of fidelity (which can also be characterized using any of many other terms such as signal degradation, attenuation, loss, noise, inter-symbol-interference ("ISI"), etc.) tends to become more of a problem as the data rate (serial bit rate) of the signal increases. The higher the data rate of a serial data signal, the more transmission degradation it is generally subject to. Degradation of a high-speed serial data signal (e.g., as described above from a programmable logic IC transmitting that signal through a transmission medium to another programmable logic IC receiving the signal) increases the difficulty that the receiving (receiver, "RX") IC has in correctly interpreting the data information in the received signal.

To help compensate for the signal degradation that can cause or contribute to RX data interpretation errors, an RX IC may be equipped with any one or more of so-called equalization and/or adaptation circuits for processing of a received high-speed serial data signal (e.g., prior to any attempt to recover data information from that signal in more downstream circuitry). In particular, signal degradation due to ISI may require the use of specialized adaptive recovery circuits. For example, Forward Equalization (e.g., R-C/FFE) circuits and Decision Feedback Equalizer (DFE) circuits may be used at the receiver end. Of these, DFE is generally regarded as the most powerful at removing Post-Cursor ISI. A DFE may have multiple "taps," each of which may include a circuit for multiplying a respective earlier (previously received) data bit value (e.g., the $k^{th}$ data bit value prior to the current bit) by a respective tap coefficient $C_k$ and additively combining all of the resulting products with the incoming signal for the current bit. The DFE is able to find optimal sets of DFE tap coefficient values so that an acceptably low bit error rate is achieved by the RX IC in recovering the data information from the received serial data signal.

A DFE may also include a summation node that uses the coefficient value to filter the received signal. The summation node may be a partial summation node, which makes use of a data slicing level ("dLev") to "slice" an error value representative of the errors caused in a received serial data signal by ISI. (The value dLev may be used in the determination of whether a symbol in a received signal is a logic one or a logic zero.) In general, dLev has been a static setting (e.g., set via configuration bits) in a programmable logic IC. This static setting may limit the quality of the results of signal conditioning adaptive recovery circuits and may also make performance prone to environmental variations such as variations in temperature, voltage, or noise. Moreover, although dLev adaptation may be used with full response/full rate DFE structures, the timing of these type of DFE structures may not be closed for high speeds such as 28 Gbps for a 20 nanometer process node. Moreover, the use of half rate DFE structures may require an excessive number of high speed multipliers and sense amplifiers (that may cause excessive loading on the summation node, increase intrinsic kickback noise generated on the summation node, and increase cost and area required for the RX) and high speed multiplexers.

Furthermore, the summation node may need a defined signal amplitude level for the received signal. The dynamic range of the received signal may be undefined, and there may be transmitter output voltage variations, channel loss characteristics that cause amplitude variation, and due to the frequency response of any RX buffers used when the incoming signal is received, the amplitude of the received signal may be uncertain.

As used herein, a bit is a binary digit, typically having a value of either 1 or 0. As used herein, the singular term "serial data signal" will generally be used as a generic term for both single-ended and differential serial data signals (even though a differential serial data signal actually includes two complementary signal constituents).

SUMMARY

Therefore, a dLev adaptation scheme may be needed to determine the optimal predicted data slicing level (dLev) for a summation node, such as a partial response summation node. Such a scheme may be able to overcome conventional bandwidth limitations, allowing operation of the RX at high speeds, such as, for example, 28 Gbps. In addition, the use of a Variable Gain Amplifier (VGA), after the use of RX buffers, but prior to the summation at the summation node, such as a partial response summation node, may be able to define the optimal amplitude of the received signal for its use at the summation node. The VGA may require adaptation to establish the proper amplitude/signaling levels.

A DFE may have a certain number of taps that are used to remove ISI contributions from that number of most-recently transmitted symbols. The coefficients may be built in or programmed at initial installation or setup or they may be derived adaptively (i.e., via adaptive equalization). The value dLev may represent the predicted data level used to slide the error value in a Sign-Sign Least-Mean Square (LMS) technique used for adapting a received signal in the adaptive equalization process. This disclosure presents a way to adaptively determine a dLev value.

Accordingly, systems and methods are described that include adaptation circuitry for processing a data signal. The adaptation circuitry may include summation node circuitry for processing an error value associated with the data signal. The adaptation circuitry may also include adaptation engine circuitry, coupled to the summation node circuitry, for controlling the operation of the summation node circuitry. In addition, systems and methods are described that include receiver circuitry for receiving a data signal. The receiver circuitry may include partial response summation node circuitry for processing an error value associated with the data signal. The receiver circuitry may also include adaptation engine circuitry, coupled to the partial response summation node circuitry, for controlling the operation of the summation node circuitry. Additionally, systems and methods are described for adapting a received data signal using adaptation circuitry. A variable gain amplifier (VGA) is set to apply a first gain to the received data signal. A number of errors associated with the received data signal is accumulated using summation node circuitry and adaptation engine circuitry. When the number of errors fails to meet a pre-defined threshold, the VGA may be set to apply a second gain to the received data signal using the adaptation engine circuitry.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

Figure 1:
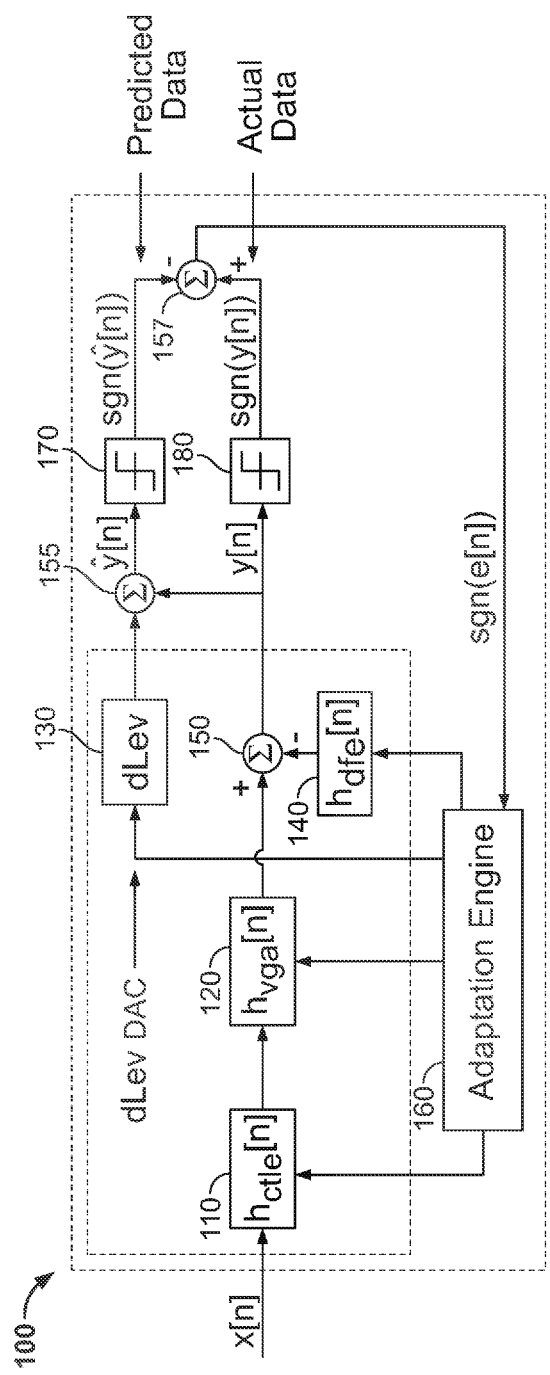
FIG. 1 shows a simplified block diagram of circuitry used to implement the Sign-Sign Least-Mean Square (LMS) technique, in accordance with some embodiments.

FIG. 1 shows a simplified block diagram of circuitry 100 used to implement the Sign-Sign Least-Mean Square (LMS) technique, which will be discussed in further detail below. Circuitry 100 includes continuous time linear equalizer 110, variable gain amplifier 120, dLev computation block 130, decision feedback equalizer 140, summers 150, 155, and 157, sign function computation units 170 and 180, and adaptation engine 160, configured as shown in FIG. 1.

Figure 2:
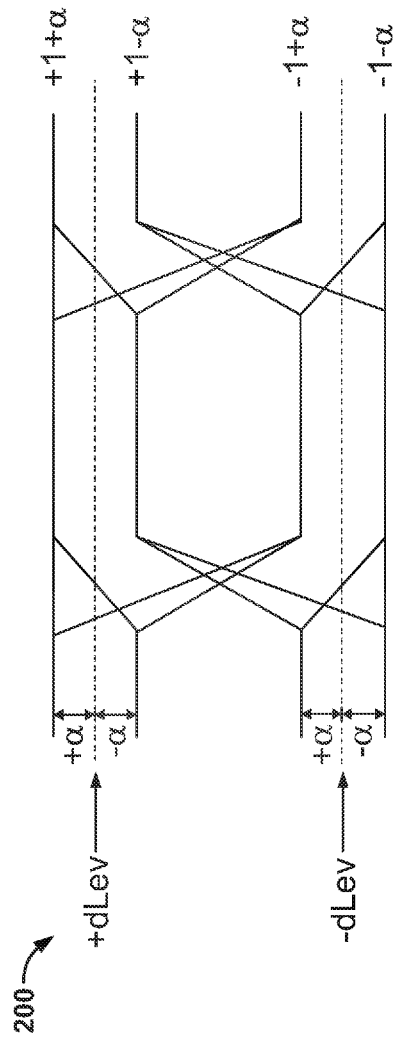
FIG. 2 shows an eye diagram of superimposed received signals that shows dLev as the statistical mean of the voltage levels of those signals that may be used to better understand the present disclosure.

FIG. 2 shows eye diagram 200 of superimposed received signals that shows dLev as the statistical mean of the voltage levels of those signals. Eye diagram 200 of the received signal results from superimposing on a single unit interval of the signal, multiple data bits from the signal. The unit interval ("UI") is the time duration of any one bit in the data signal. The horizontal axis of a typical eye diagram is time, and the vertical axis is signal voltage. As shown in FIG. 2, eye diagram 200 (i.e., the closed-loop signal traces shown in FIG. 2) of the received signal is often not symmetrical in the vertical direction, due to issues such as ISI. In particular, the superpositioned received signals have voltage level variations due to ISI energy. In this figure +dLev and −dLev represent the statistical means of the voltage levels of the received signal, which represent a logic one (indicated by, e.g., +1) or a logic zero (indicated by, e.g., −1). The value +α and −α represent, respectively, the positive valued and the negative valued deviation of the voltage levels from the values of +dLev and −dLev. Thus, dLev, is the optimal data slicing level in order to determine whether a symbol in the received signal is a logic one or a logic zero.

Figure 3:
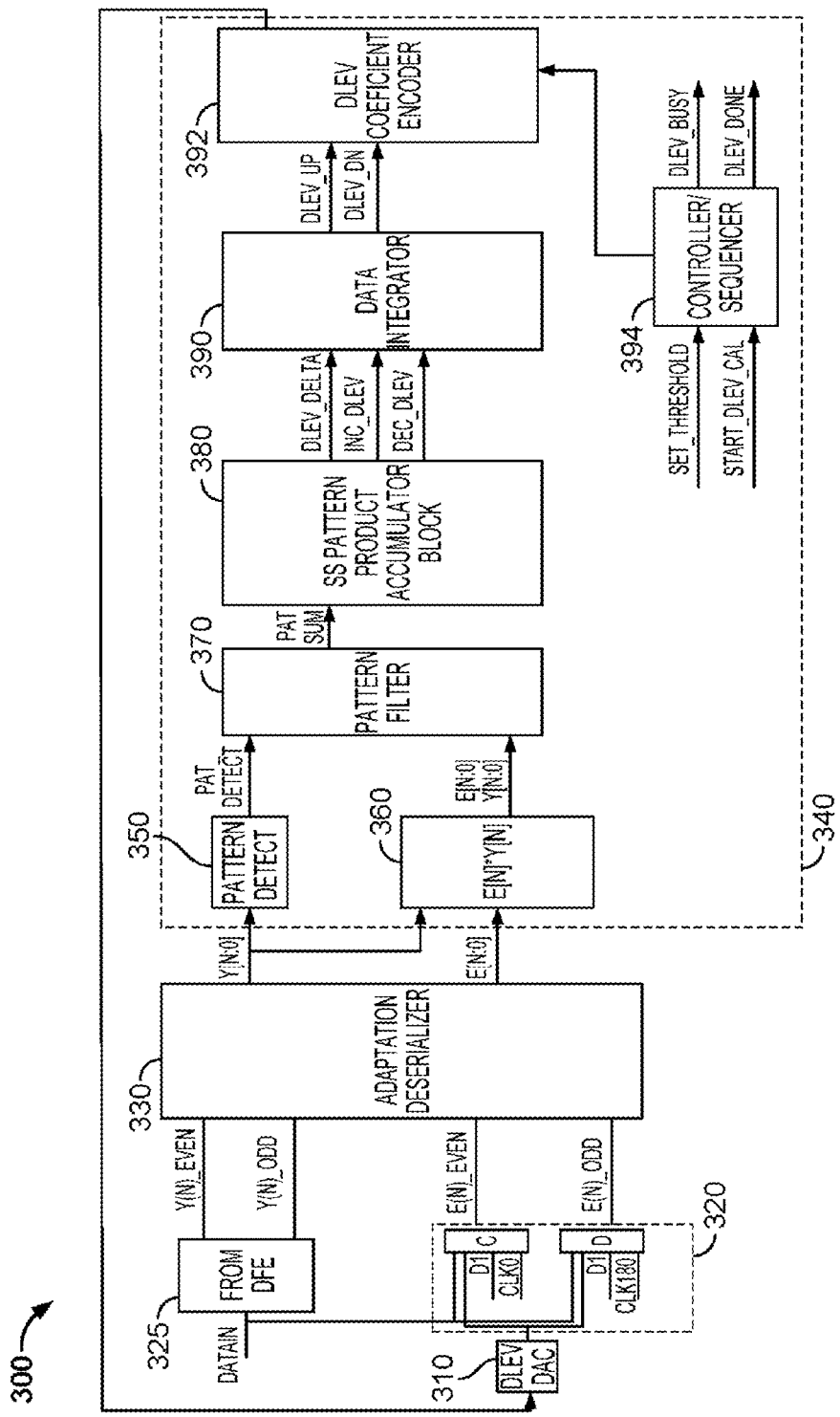
FIG. 3 shows a first type of adaptation circuitry used at a receiver (RX) to process a received high-speed serial data signal, in accordance with some embodiments.

FIG. 3 shows a first type of adaptation circuitry 300 used at a receiver (RX) to process a received high-speed serial data signal, in accordance with some embodiments. Adaptation circuitry 300 includes dLev Digital-to-Analog Convertor (DAC) 310, partial response summation node 320, adaptation/data deserializer 330, partial response dLev Sign-Sign LMS adaptation engine 340, and other circuitry such as DFE 325. Partial response dLev Sign-Sign LMS adaptation engine 340 may also include pattern detector 350, sign product generator 360, pattern filter 370, data accumulator 380, data integrator 390, dLev coefficient generator/encoder 392, and controller/sequencer 394. Adaptation circuitry 300 may allow the dLev value to converge to an optimal predicted value at a rapid rate. DAC 310 may convert encoded digital data into an analog voltage. The output of DAC 310 may span the received signal's dynamic range (e.g., in terms of amplitude and frequency) at summation node 320. The operation of DAC 310 may be controlled by partial response dLev Sign-Sign LMS adaptation engine 340, e.g., via dLev coefficient generator/encoder 392. Partial response summation node 320 may be used to achieve 28 Gbps operation by the receiver (RX).

Such a partial response summation node may be used instead of a full response node, because a full response DFE may not be able to close its feedback while operating at speeds such as 28 Gbps, for the first tap coefficient (i.e., the tap coefficient may need to instead be speculated). Moreover, the use of a full response summation node, as opposed to a partial response summation node, may require an excessive number (e.g., eight) of sense amplifiers, which may cause excessive loading on the summation node, and may cause excessive bandwidth limitations.

Partial response summation node 320 may make use of two sense amplifiers to "slice" a predicted error value representative of the errors caused in a received serial data signal by ISI. In having fewer sense amplifiers, this design may trade off the physical limitations (i.e., the use of two sense amplifiers) of summation node 320 for an extended use of digital signal processing in partial response dLev Sign-Sign LMS adaptation engine 340. In particular, partial response summation node 320 may make use of existing DFE data from a DFE data path (i.e., data from a signal processing engine in partial response dLev Sign-Sign LMS adaptation engine 340) to select a correct tap coefficient value (a speculated tap coefficient value that has been pre-calculated) to be used in processing any received signals. More specifically, multiplexing +/−α and +/−dLev may enable a down stream signal processing engine, e.g. in partial response dLev Sign-Sign LMS adaptation engine 340, to control partial response summation node 320 and filter data from a received signal to statistically capture data that would be captured by a full response summation node. Moreover, by reducing the number of sense amplifiers used in comparison with a full response summation node, kick back noise and parasitic loading (e.g., parasitic capacitance) may be reduced to achieve a higher operating speed for, such as, for example 28 Gbps, for the receiver (RX). In addition, in comparison with a half rate full response summation node, a partial response summation node may have reduced power consumption and an increased bandwidth.

Adaptation/data deserializer 330 may convert incoming half-rate data (e.g., $y[n]_{even}$ and $y[n]_{odd}$) into data for a slower frequency parallel bus.

Adaptation/data deserializer 330 may convert incoming half-rate predicted data (e.g., $e[n]_{even}$ and $e[n]_{odd}$) into data for the slower frequency parallel bus. Adaptation/data deserializer 330 may be needed to reduce the incoming data rate (of the data in the received signal) to the value of Fmax for the digital adaptation circuitry, such as adaptation circuitry 300.

Partial response dLev Sign-Sign LMS adaptation engine 340 may be used to compute $C_k(n+1) = C_k(n) + \mu \cdot sgn[e(n)] \cdot sgn[y(n)]$ in the Sign-Sign LMS technique where $C_k(n+1)$ is the new coefficient, $C_k(n)$ is the previous coefficient, $\mu$ is a convergence factor, y(n) is the decided data signal (i.e., the digital signal derived from the nth sample), e(n) is the error signal associated with the nth sample, and sgn[x] is a sign function that returns +1 for x>0 and −1 for x<0. DFE 325 may be any adaptive equalizer, such as a decision feedback equalizer that adapts to the time-varying properties of a communications channel, to equalize an incoming signal.

Pattern detector 350 may receive the signal y(n) from adaptation/data deserializer 330 and may detect if incoming data is valid based on the signals from the multiplexed signals +/−α and +/−dLev from partial response summation node 320. If (−dlev) and (−α) are received, then pattern detector 350 may determine that the pattern is valid if the received data is 2'b00. If (−dlev) and (+α) are received, then pattern detector 350 may determine that the pattern is valid if the received data is 2'b01. If (+dlev) and (−α) are received, then pattern detector 350 may determine that the pattern is valid if the received data is 2'b10. If (+dlev) and (+α) are received, then pattern detector 350 may determine that the pattern is valid if the received data is 2'b11. Pattern detector 350 may output a signal (e.g., signal pat_det) to pattern filter 370 that indicates whether the incoming data is valid based on the determination by pattern detector 350 of whether the pattern is valid.

Sign product generator 360 may receive the signals e(n) and y(n) from adaptation/data deserializer 330 and compute the bitwise product $sgn[e(n)] \cdot sgn[y(n)]$ for use in the Sign-Sign LMS technique computation.

Pattern filter 370 may receive the bitwise product $sgn[e(n)] \cdot sgn[y(n)]$ from sign product generator 360 and the output from pattern detector 350. Pattern filter 370 may output (e.g., as signal pat_sum) the filtered version of the input from sign product generator 360, and may pass the bitwise product $sgn[e(n)] \cdot sgn[y(n)]$, for example, only when the output of pattern detector 350 indicates that the incoming data is valid based on the determination by pattern detector 350 of whether the pattern is valid.

Data accumulator 380 may receive the output of pattern filter 370 and may accumulate the summation of bitwise sign products in parallel per parallel clock cycles. Data accumulator 380 may output the accumulated value as a signal (e.g., signal dLev_delta). In every clock cycle, data accumulator 380 may also determine whether the result of the accumulated bitwise sign products is positive or negative. If the result is positive, data accumulator 380 may assert a first signal (e.g., dLev_inc). If the result is negative, data accumulator 380 may assert a second signal (e.g., dLev_dec). The outputs of data accumulator 380 may be input to data integrator 390.

Data integrator 390 may operate as an averaging filter. In particular, data integrator 390 may average the filtered product of sign errors produced by data accumulator 380. Data integrator 390 may output signals (e.g., dLev_up and dLev_dn) to control the incrementing or the decrementing of dLev coefficient generator/encoder 392. In particular, data integrator 390 may assert, increment, or decrement one or more output signals (e.g., dLev_up and dLev_dn) when the average of the filtered product (integration value) of sign errors produced by data accumulator 380 reach pre-defined thresholds. These signals may control the operation of dLev coefficient generator/encoder 392.

dLev coefficient generator/encoder 392 may generate the dLev DAC 310 coefficients based on the output signals (dLev_up and dLev_down) received from data integrator 390. These dLev DAC 310 coefficients produced by dLev coefficient generator/encoder 392 may be encoded using any suitable encoding scheme to reduce or prevent possible switching noise.

Controller/sequencer 394 may control the averaging of the multiplexing of +/−α at the partial response summation node 320. Controller/sequencer 394 may also control the averaging of the multiplexing of +/−dLev at the partial response summation node 320. Controller/sequencer 394 may control the selection of a valid pattern within pattern detector 350. Controller/sequencer 394 may also sequence the initialization (e.g., via an output signal dLev_BUSY) and the resetting (e.g., via an output signal dLev_DONE) for all of the blocks and/or circuitry within the partial response dLev Sign-Sign LMS adaptation engine 340. Any thresholds referred to herein may be set at controller/sequencer 394 using an input signal (e.g., SET_THRESHOLD). Controller/sequencer 394 may be used to calibrate partial response dLev Sign-Sign LMS adaptation engine 340 by asserting a calibration input signal (e.g., START_dLev_CAL) on controller/sequencer 394.

Figure 4:
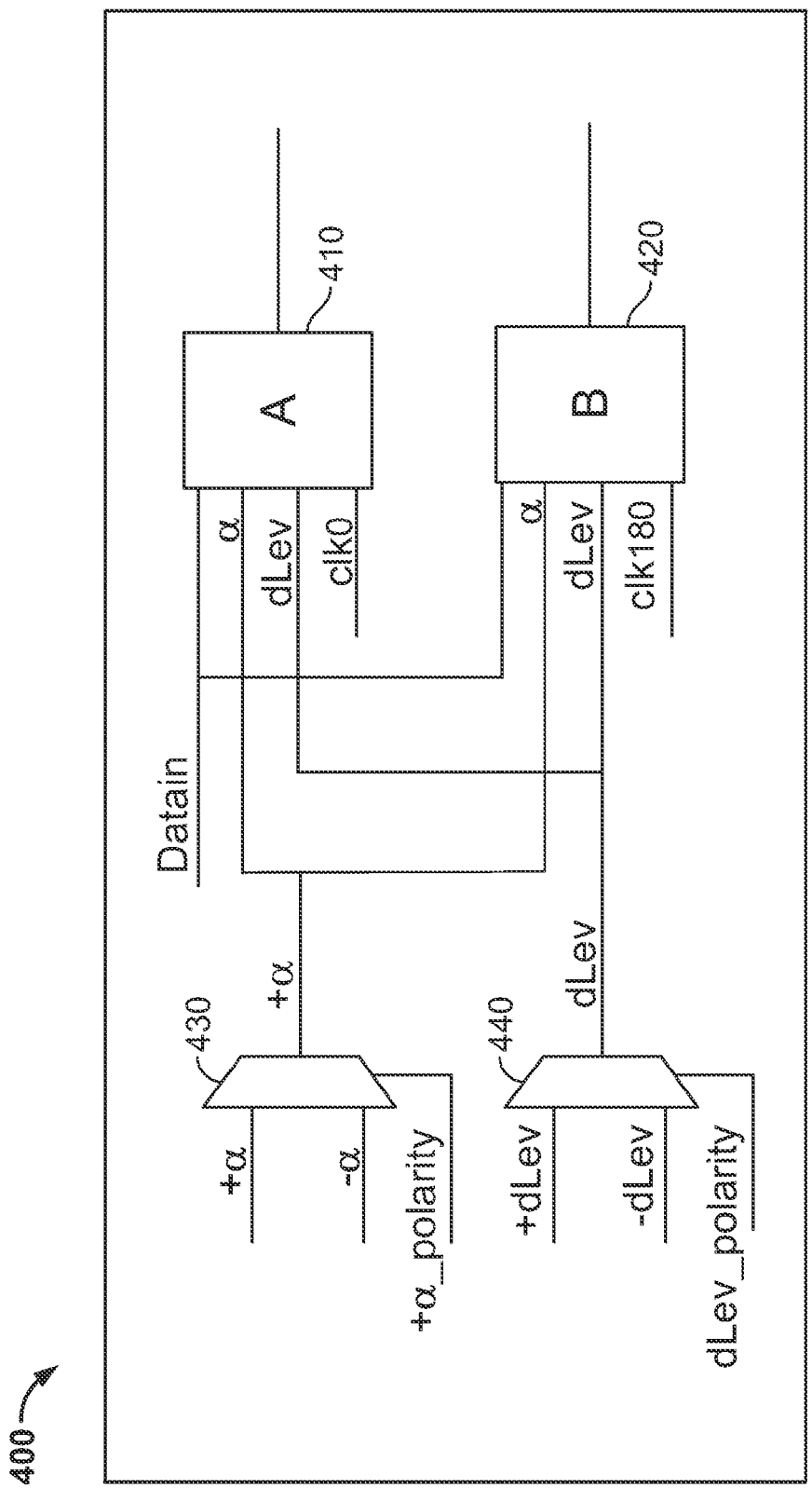
FIG. 4 shows a partial response summation node, similar in form and function to the one shown within the circuitry of FIG. 3, in accordance with some embodiments.

FIG. 4 shows partial response summation node 400, similar in form and function to Partial response summation node 320 shown within the circuitry of FIG. 3, in accordance with some embodiments. Partial response summation node 400 may make use of sense amplifier 410 and sense amplifier 420 to "slice" a predicted error value representative of the errors caused in a received serial data signal by ISI. In having fewer sense amplifiers, this design of node 400 may trade off the physical limitations (i.e., the use of two sense amplifiers, 410 and 420) of summation node 400 for an extended use of digital signal processing in partial response dLev Sign-Sign LMS adaptation engine. Partial response summation node 400 may make use of the values +α and −α, and the values +dLev and −dLev, and the polarities of α and dLev as inputs to multiplexers 430 and 440. Multiplexers 430 and 440 may equivalently each be replaced by any suitable selection circuitry.

In particular, partial response summation node 400 may make use of existing DFE data from a DFE data path (e.g., data from a signal processing engine in partial response dLev Sign-Sign LMS adaptation engine 340) to select (using multiplexers 430 and 440) a correct tap coefficient value (a speculated tap coefficient value that has been pre-calculated) to be used in processing any received signals. More specifically, multiplexing +/−α and +/−dLev may enable a down stream signal processing engine, e.g. in partial response dLev Sign-Sign LMS adaptation engine 340, to control partial response summation node 320 and filter data from a received signal to statistically capture rata that would be captured by a full response summation node. Moreover, by reducing the number of sense amplifiers used in partial response summation node 400 in comparison with a full response summation node, kick back noise and parasitic loading (e.g., parasitic capacitance) may be reduced to achieve a higher operating speed for, such as, for example 28 Gbps, for the receiver (RX). In addition, in comparison with a half rate full response summation node, partial response summation node 400 may have reduced power consumption and an increased bandwidth.

Figure 5:
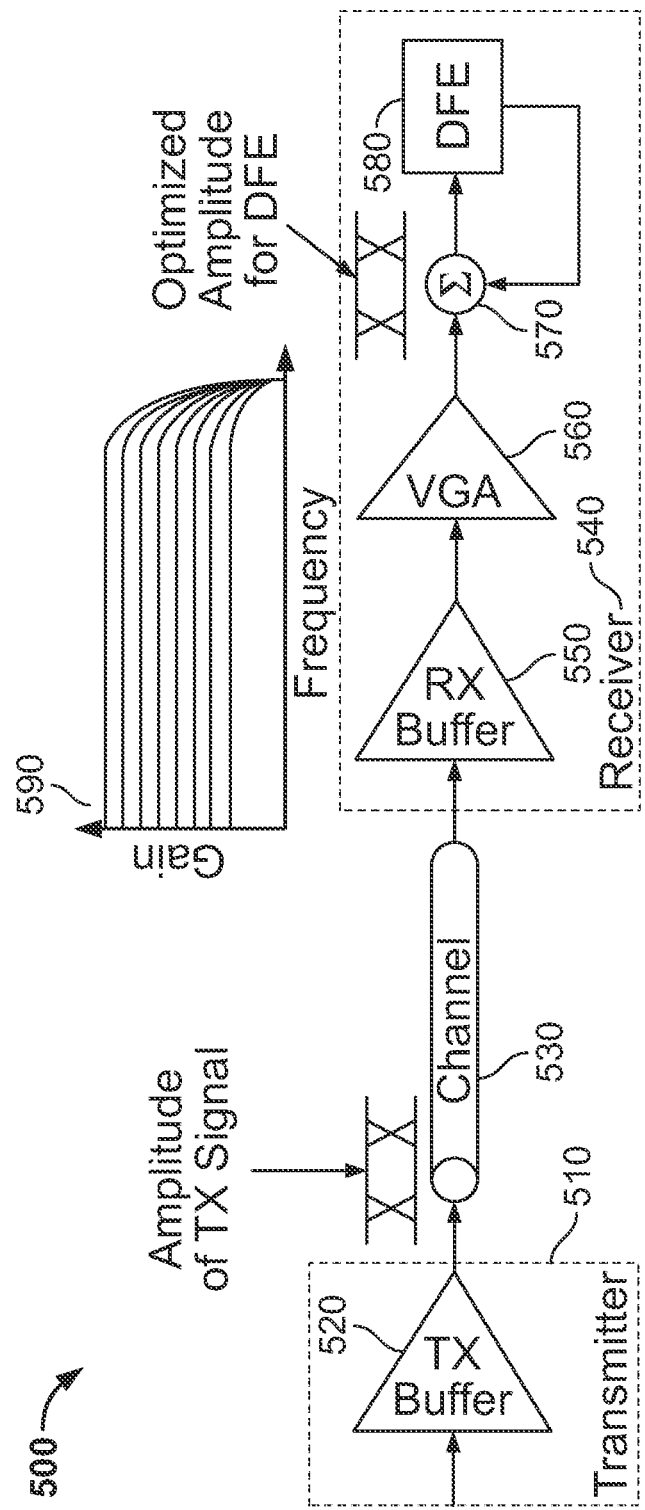
FIG. 5 shows a communication system, which makes use of a Variable Gain Amplifier (VGA) in the receiver (RX), but prior to the summation at the summation node.

FIG. 5 shows communication system 500, which makes use of Variable Gain Amplifier (VGA) 560 in the receiver (RX) 540, but prior to the summation at summation node 570. Communication system 500 includes transmitter (TX) 510, communications channel 530, and receiver (RX) 540. TX 510 includes transmit buffer (TX buffer) 520. RX 540 includes receive buffer (RX buffer) 550, Variable Gain Amplifier (VGA) 560, summation node 570, and DFE 580. TX 510 may be used to transmit a data signal through communications channel 530. TX buffer 520 may buffer the data signal that is to be transmitted by TX 510. The data signal may propagate through communications channel 530, which may be any medium used for the communication of such signals. The data signal may be generally subject to loss of clarity or fidelity as it propagates through communications channel 530. Such loss of fidelity may also be characterized using any of many other terms such as signal degradation, attenuation, loss, noise, inter-symbol-interference ("ISI"), etc. RX 540 may then receive the data signal. Within RX 540, the RX buffer 550 may buffer the received data signal and may output that data signal to VGA 560. VGA 560 may apply a gain to the received data signal by, for example, amplifying the received data signal by some magnitude. However, the determination of the magnitude by which to amplify the received data signal may require adaptation of the received data signal, using adaptation circuitry, to establish the proper amplitude/signaling levels. In particular, the magnitude of amplification at VGA 560 may need to be adjusted to be able to properly define the amplitude of the received signal for its use at the summation node.

Chart 590 shows an example transfer function of different configurable/selectable (e.g., via a control signal) gain levels (y-axis) that can be applied to the received data signal versus the frequencies (x-axis) across which the gain may be applied. After a gain is applied to the received data signal by VGA 560, the received data signal may be output to summation node 570. Summation node 570 may be similar in form and function to partial response summation node 320 of FIG. 3 or partial response summation node 400 as described with reference to FIG. 4. DFE 580 may be similar in form and function to DFE 325 as described with reference to FIG. 3. In some embodiments, DFE 580 may output the equalized received data signal to summation node 570, as a feedback input.

The use of a VGA 560 after RX buffers 550, but prior to the summation at summation node 570, such as a partial response summation node, may allow for the amplitude of the received signal to be defined for its use at summation node 570. VGA 560 may be used to maintain proper signaling levels at summation node 570, and the output of VGA 560, which is input to summation node 570, may be at the proper signaling levels. In addition, VGA 560 may ensure the linear functionality of DFE 580. Use of a partial response summation node (such as summation node 570) may allow for the optimization of bandwidth, for example, in such a way as to achieve 28 Gbps operation by the receiver (RX). Moreover, as presented herein, using a partial response dLev Sign-Sign LMS adaptation engine and/or a VGA partial response adaptation engine, together with a partial response summation node, may overcome the complexities that may be inherent to the use of the partial response summation node.

Figure 6:
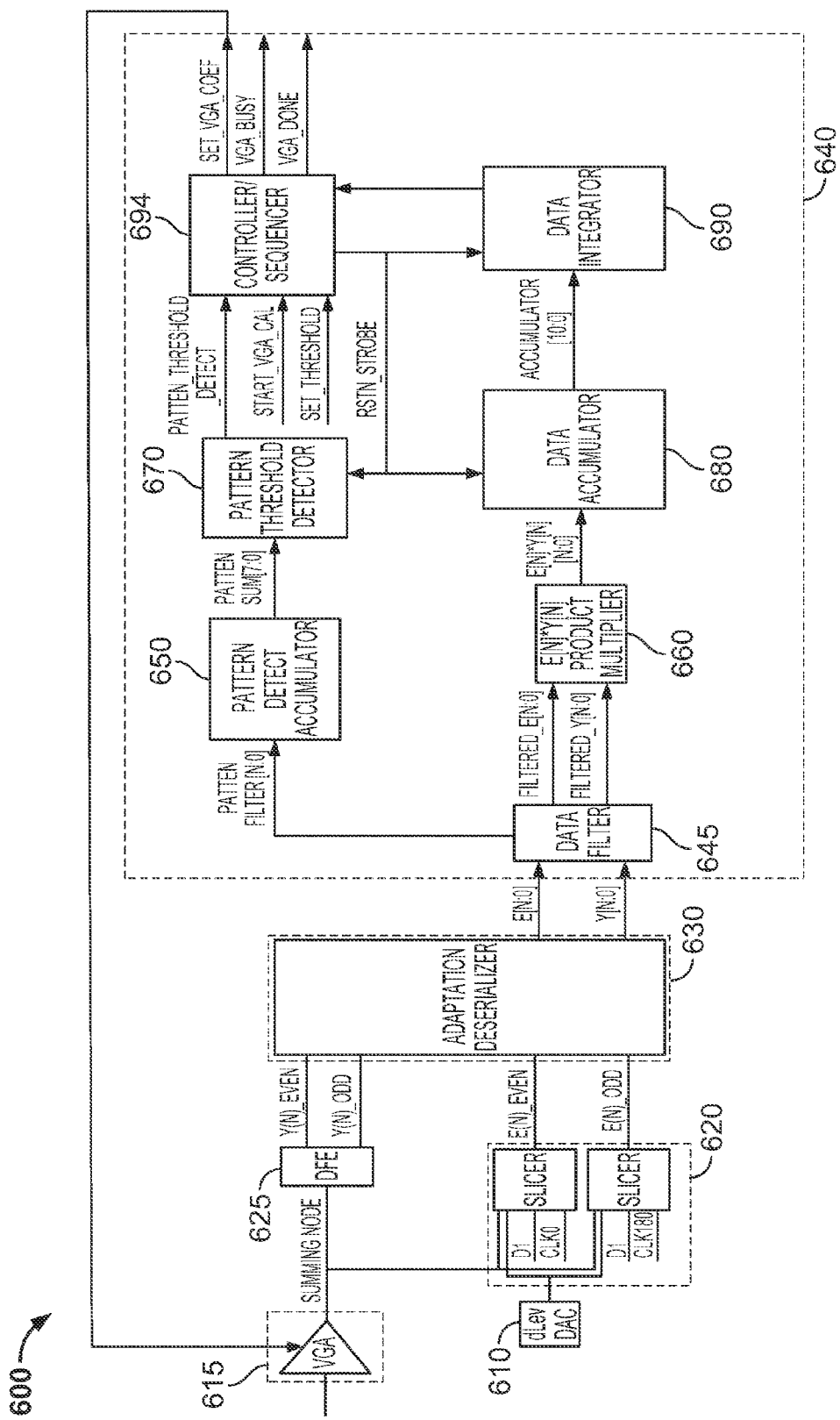
FIG. 6 shows a second type of adaptation circuitry used at a receiver (RX) to process a received high-speed serial data signal, in accordance with some embodiments.

FIG. 6 shows adaptation circuitry 600 used at a receiver (RX) to process a received high-speed serial data signal, in accordance with some embodiments. Adaptation circuitry 600 includes dLev Digital-to-Analog Convertor (DAC) 310, Variable Gain Amplifier (VGA) 615, partial response summation node 620, adaptation/data deserializer 630, VGA partial response adaptation engine 640, and other circuitry such as DFE 625. VGA partial response adaptation engine 640 may also include data filter 645, pattern detect accumulator 650, sign product generator 660, pattern threshold detector 670, data accumulator 680, data integrator 690, and controller/sequencer 694. DAC 610 may convert encoded digital data into an analog voltage. The output of DAC 610 may span the received signal's dynamic range (e.g., in terms of amplitude and frequency) at summation node 620. The operation of DAC 620 may controlled by VGA partial response adaptation engine 640. Partial response summation node 620 may be used to achieve 28 Gbps operation by the receiver (RX).

VGA 615 may be similar to VGA 560 as described with reference to FIG. 5. In particular, a received data signal may be input to VGA 560. VGA 615 may apply a gain to the received data signal by, for example, amplifying the received data signal by some magnitude. However, the determination of the magnitude by which to amplify the received data signal may require adaptation of the received data signal, using adaptation circuitry, to establish the proper amplitude/signaling levels. In particular, the gain applied by VGA 615 may be variable and may be changed by a control signal provided to VGA 615, for example, by a signal output by controller/sequencer 694 within adaptation circuitry 600.

VGA 615 may be able to properly define the amplitude of the received signal for its use at a summation node. VGA 615 may ensure that the outer envelope of the received data signal at a summation node is optimal for use in DFE. In addition, VGA 615 may compensate for various received data signal conditions within any system in which adaptation circuitry 600 is being used. After a gain is applied to the received data signal by VGA 615, the received data signal may be output to summation node 620. An example transfer function of VGA 615 is shown as chart 590 of FIG. 5.

Partial response summation node 620 may be similar in form and in function to partial response summation node 320 as described with reference to FIG. 3, to partial response summation node 400 as described with reference to FIG. 4, and/or summation node 570 as described with reference to FIG. 5.

DFE 625 may be similar in form and function to DFE 325 as described with reference to FIG. 3. In some embodiments, DFE 625 may output the equalized received data signal to summation node 620, as a feedback input. Adaptation/data deserializer 630 may be similar in form and in function to adaptation/data deserializer 330 as described with reference to FIG. 3.

Data filter 645 may receive the signals y(n) and e(n) from adaptation/data deserializer 630 and may detect if incoming data is valid based on the signals from the multiplexed signals +/−α and +/−dLev from partial response summation node 620. If (+dlev) and (+α) are received, then data filter 645 may determine that the pattern is valid if the received data is 2'b11. If (−dlev) and (−α) are received, then data filter 645 may determine that the pattern is valid if the received data is 2'b00. Data filter 645 may output a signal (e.g., Pattern Filter) to pattern detect accumulator 650 that indicates the number of detected valid patterns for pattern detect accumulator 650 to process. Data filter 645 may also output parallel signals to sign product generator 660 that are the filtered errors (e.g., Filtered_e) and a latency matched data signal (e.g., Filtered_y).

Sign product generator 660 may be similar in form and in function to sign product generator 360 as described with reference to FIG. 3. Sign product generator 660 may output the bitwise product $\text{sgn}[e(n)] \cdot \text{sgn}[y(n)]$ to data accumulator 680.

Data accumulator 680 may receive the output of sign product generator 660 and may accumulate (e.g., N=N+the input to data accumulator 680) the summation of bitwise sign products in parallel per parallel clock cycles. Data accumulator 680 may output the accumulated value as a signal (e.g, signal Accumulator) to data integrator 690 to filter out high frequency components in the outputted signal.

Data integrator 690 may operate as an averaging filter. In particular, data integrator 690 may average (e.g., N=(N+the input to data integrator 690)/M) output signal from data accumulator 680. In particular, data integrator 690 may serve as an averaging filter for the accumulated sign product. In addition, data integrator 690 may average the filtered product of sign errors produced by data accumulator 680. Data integrator 390 may output (as a signal) its result to controller/sequencer 694 for further processing.

Pattern detect accumulator 650 may receive the output of data filter 645 and may accumulate the summation of bitwise patterns detected value of this input received from data filter 645. Pattern detect accumulator may output this running accumulated value (e.g., via signal Pattern Sum) to pattern threshold detector 670.

Pattern threshold detector 670 may receive the output of pattern detect accumulator 650 and may determine when the running total of patterns detected reaches a pre-defined threshold. When the pre-defined threshold is reached, pattern threshold detector 670 may output an asserted signal (e.g., Pattern_Threshold_Detect) to controller/sequencer 694.

Controller/sequencer 694 may sequence the initialization and controls for all of the circuitry within VGA partial response adaptation engine 640. In addition, controller/sequencer 694 may control the operation of VGA 615 (which may be used to control partial response summation node 620 based on the outputs of controller/sequencer 694). Controller/sequencer 694 may receive the output of pattern threshold detector 670 and the outputs of one or more of the other circuitry within VGA partial response adaptation engine 640, and may process this input data to control the amplification level of VGA 615. The adaptation process for setting the amplification level of VGA 615 will be described in reference to FIG. 7, below.

Figure 7:
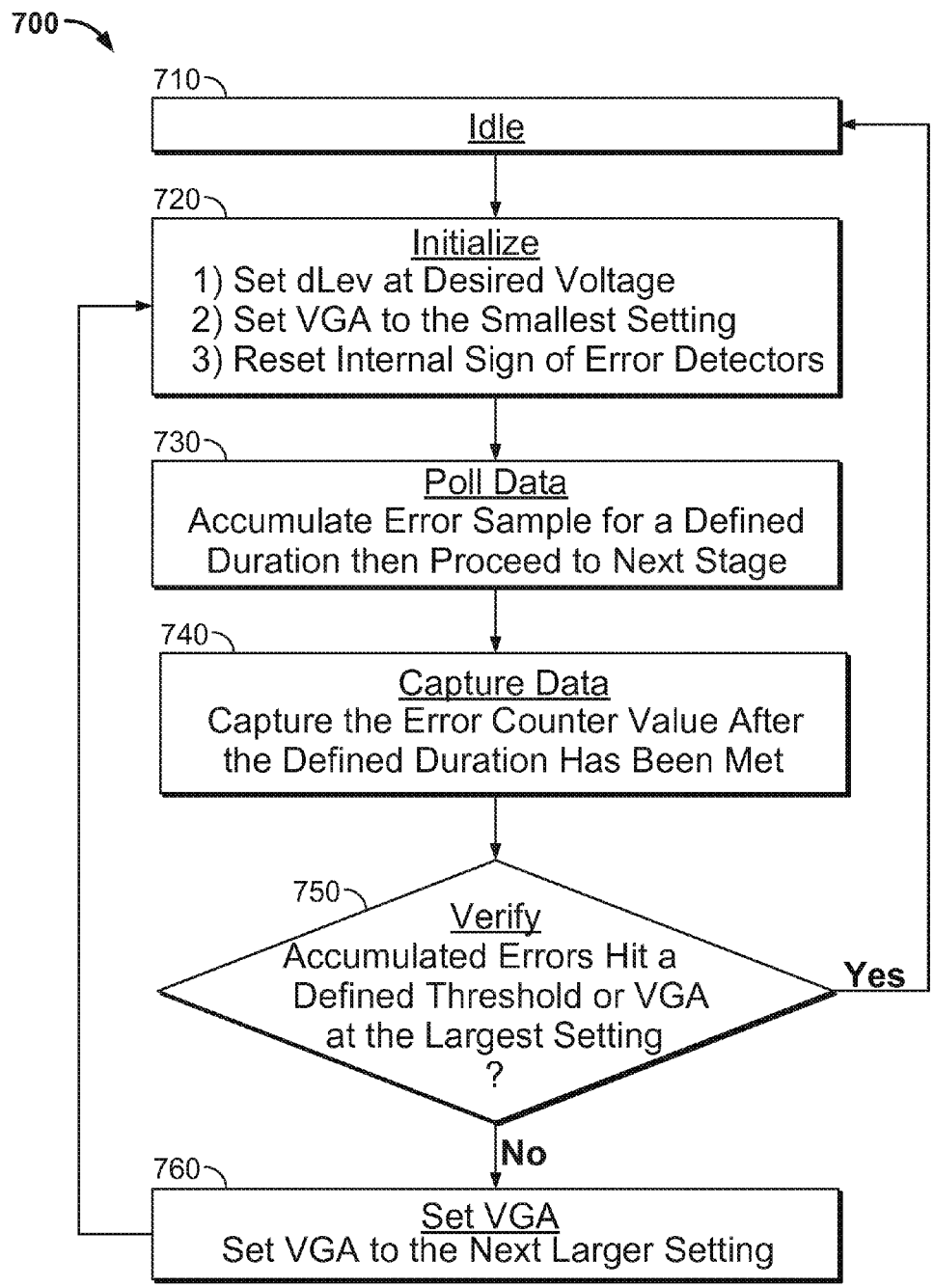
FIG. 7 shows a flow diagram of the Variable Gain Amplifier (VGA) adaptation process, in accordance with some embodiments.

FIG. 7 shows an illustrative Variable Gain Amplifier (VGA) adaptation process in accordance with an illustrative embodiment. Process 700 may be used for setting the amplification level of VGA 615 as discussed above with respect to FIG. 6.

Process 700 starts at 710 where the adaptation engine circuitry, such as VGA partial response adaptation engine 640, is idle. At 720, the adaptation engine circuitry is initialized. First, dLev is set at a desired voltage level. Second, VGA 615 is set to the smallest setting (e.g., the smallest amplification level). Third, the internal signs of error detectors at summation node circuitry (e.g., partial response summation node 620) are reset. At 730, data accumulator 680 polls the summation of bitwise sign products data received to accumulate error sample for a defined duration. After the defined duration, at 740, the error samples accumulated is captured by controller/sequencer 694. At 750, controller/sequencer 694 verifies if the accumulated error samples meet a pre-defined threshold or if VGA 615 is already at the largest setting (e.g., the highest amplification level attainable). If the accumulated error samples have met or exceeded the threshold or if the VGA is already set at the largest setting, the process is complete and the adaptation engine circuitry returns to the idle state. If, however, the accumulated error samples fails to meet the pre-defined threshold and VGA 615 is not yet set at the largest setting, controller/sequencer 694 will set VGA 615 to the next larger setting (e.g., the next higher amplification level), at 760.

Figure 8:
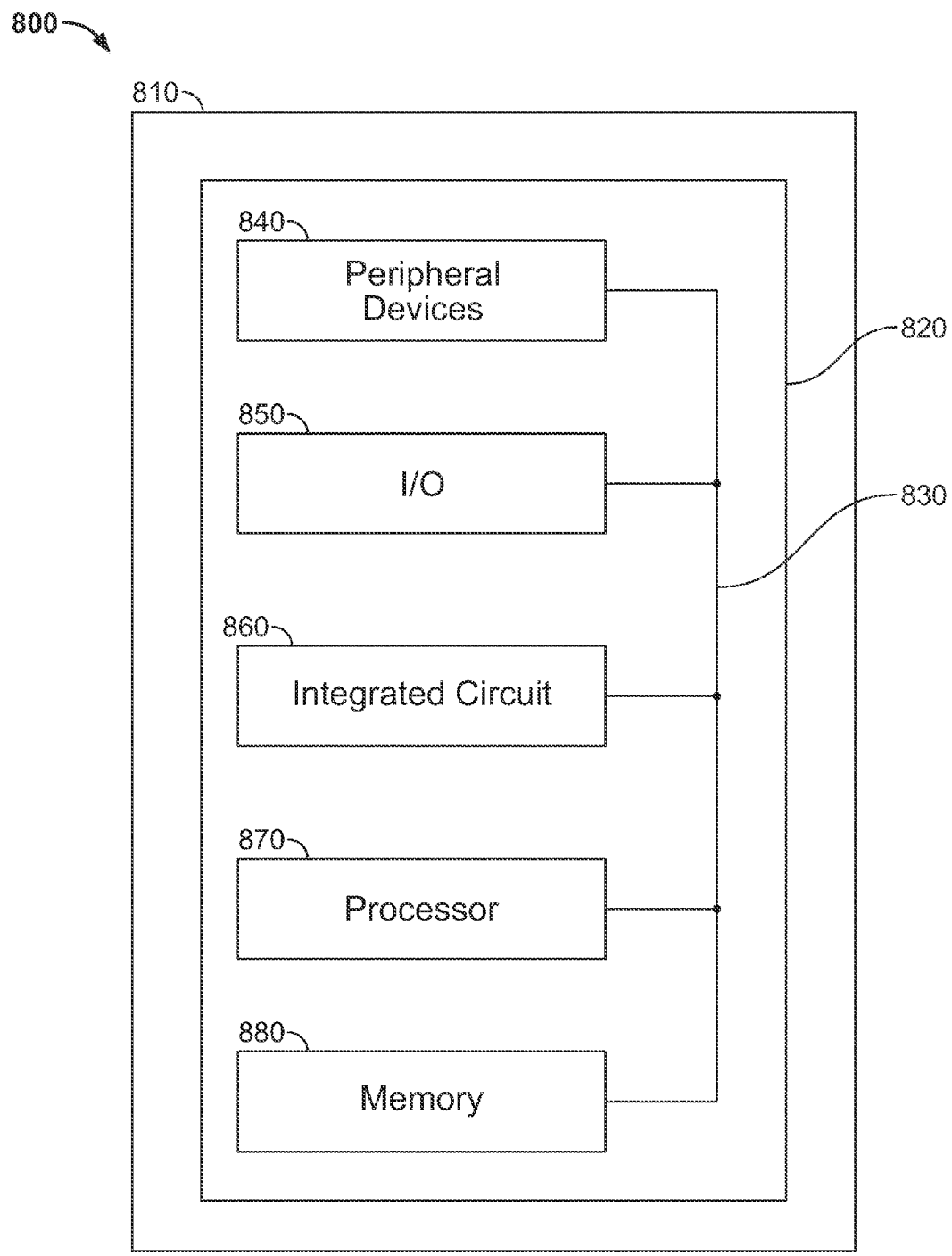
FIG. 8 is a simplified block diagram of an illustrative system employing an integrated circuit device incorporating aspects of the present disclosure, in accordance with some embodiments.

FIG. 8 illustrates a circuit or other device 860 that includes embodiments of the adaptation circuitry and other circuitry as described herein as being within a data processing system 800. In an embodiment, integrated circuit or device 860 may be an integrated circuit, application specific standard product (ASSP), application specific integrated circuit (ASIC), programmable logic device (PLD) (including a Field-Programmable Gate Array (FPGA), full-custom chip, or a dedicated chip). In some embodiments, element 860 may include adaptation circuitry 300 and/or 600 and/or circuitry 100 and/or 500. Data processing system 800 may include one or more of the following components: circuit 860, processor 870, memory 880, I/O circuitry 850, and peripheral devices 840. These components are connected together by a system bus or other interconnections 830 and are populated on a circuit board 820 which is contained in an end-user system 810.

System 800 could be used in a wide variety of applications, such as communications, computer networking, data networking, instrumentation, video processing, digital signal processing, or any other application where the advantage of using programmable or reprogrammable logic is desirable. Circuit 860 may be used to perform a variety of different logic functions. For example, circuit 860 may be configured as a processor or controller that works in cooperation with processor 870. Circuit 860 may also be used as an arbiter for arbitrating access to a shared resource in system 800. In yet another example, circuit 860 can be configured as an interface between processor 870 and one of the other components in system 800. It should be noted that system 800 is only exemplary, and that the true scope and spirit of the invention should be indicated by the following claims.

Although components in the above disclosure are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

The embodiments shown in this disclosure may save power and area, and in so doing, may also increase performance. Although these quantities may be easy to measure, the individual contributions of particular circuitry within the embodiments shown in this disclosure may be difficult to separate from contributions of other circuitry on any device or chip on which the circuitry are implemented.

Interactive interface applications and/or any instructions for layout of or use of the circuit designs of any the embodiments described herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, solid state memory, processor caches, Random Access Memory ("RAM"), etc.

It will be understood that the foregoing is only illustrative of the principles of the invention, and that various modifications may be made by those skilled in the art without departing from the scope and spirit of the invention, and the present invention is limited only by the claims that follow. For example, the various inventive aspects that have been discussed herein can either all be used together in certain embodiments, or other embodiments may employ only one or more (but less than all) of the inventive aspects. And if multiple (but less than all) of the inventive aspects are employed, that can involve employment of any combination of the inventive aspects. As another example of possible modifications, throughout this disclosure, particular numbers of components used in controllers are mentioned. These particular numbers are only examples, and other suitable parameter values can be used instead if desired.

What is claimed is:

1. Adaptation circuitry for processing a data signal, the adaptation circuitry comprising:
    a data slicing level (dLev) Digital-to-Analog Convertor (DAC) for outputting a predicted dLev value associated with the data signal;
    summation node circuitry, coupled to the dLev DAC, for processing an error value associated with the data signal based on the predicted dLev value; and
    adaptation engine circuitry, coupled to the summation node circuitry, for controlling an operation of the summation node circuitry.

2. The adaptation circuitry of claim 1, wherein the adaptation engine implements a Sign-Sign Least-Mean Square (LMS) technique.

3. The adaptation circuitry of claim 1, wherein the VGA is controlled by the adaptation engine circuitry, and wherein the VGA is used to apply a gain to the data signal.

4. The adaptation circuitry of claim 1, wherein the error value is associated with a data slicing level (dLev) value.

5. The adaptation circuitry of claim 1, wherein the summation node circuitry is partial response summation node circuitry to enable the adaptation engine circuitry to statistically filter the data signal.

6. The adaptation circuitry of claim 1, wherein the summation node circuitry includes only two sense amplifiers.

7. The adaptation circuitry of claim 1, wherein the adaptation circuitry is used to determine the dLev value associated with the data signal.

8. The controller of claim 1, wherein the adaptation circuitry is used to determine an optimal amplitude for the data signal.

9. Receiver circuitry for receiving a data signal, the receiver circuitry comprising:
    a data slicing level (dLev) Digital-to-Analog Convertor (DAC) for outputting a predicted dLev value associated with the data signal;
    partial response summation node circuitry, coupled to the dLev DAC, for processing an error value associated with the data signal based on the predicted dLev value; and
    adaptation engine circuitry, coupled to the partial response summation node circuitry, for controlling an operation of the partial response summation node circuitry.

10. The receiver circuitry of claim 9, wherein the adaptation engine implements a Sign-Sign Least-Mean Square (LMS) technique.

11. The receiver circuitry of claim 9, wherein the VGA is controlled by the adaptation engine circuitry, and wherein the VGA is used to apply a gain to the data signal.

12. The receiver circuitry of claim 9, wherein the partial response summation node circuitry enables the adaptation engine circuitry to statistically filter the data signal.

13. The receiver circuitry of claim 9 further comprising decision feedback equalizer (DFE) circuitry operating in parallel with the partial response summation node circuitry.

14. The receiver circuitry of claim 9, wherein the partial response summation node circuitry includes only two sense amplifiers.

15. The receiver circuitry of claim 9, wherein the receiver circuitry is used to determine a data the dLev value associated with the data signal.

16. The receiver circuitry of claim 9, wherein the receiver circuitry is used to determine an optimal amplitude for the data signal.

17. A method for adapting a received data signal using adaptation circuitry, the method comprising:
    setting a variable gain amplifier (VGA) to apply a first gain to the received data signal;
    outputting a predicted data slicing level (dLev) value associated with the received data signal using a dLev Digital-to-Analog Convertor (DAC);
    accumulating a number of errors associated with 10 the received data signal using summation node circuitry and adaptation engine circuitry based on the predicted dLev value; and
    when the number of errors fails to meet a pre-defined threshold, setting the VGA to apply a second gain to 15 the received data signal using the adaptation engine circuitry.

18. The method of claim 17, wherein the second gain is larger than the first gain.

19. The method of claim 17, wherein the accumulating comprises using the summation node circuitry to enable the adaptation engine circuitry to statistically filter the received data signal.

* * * * *